United States Patent

Kishi et al.

[11] Patent Number: 4,678,223
[45] Date of Patent: Jul. 7, 1987

[54] COWLING DEVICE FOR RIDING TYPE VEHICLES

[75] Inventors: Toshiaki Kishi; Mitsuyoshi Kohama, both of Tokyo, Japan

[73] Assignee: Honda Giken Kogyo Kabushiki Kaisha, Tokyo, Japan

[21] Appl. No.: 812,655

[22] Filed: Dec. 23, 1985

[30] Foreign Application Priority Data

Dec. 26, 1984 [JP]  Japan ............................ 59-199547[U]

[51] Int. Cl.⁴ ...................... B62J 17/02; B60K 11/08
[52] U.S. Cl. .................................. 296/78.1; 296/208;
        180/219; 180/68.1; 280/289 S; 411/353;
        411/517
[58] Field of Search ................... 296/78.1, 78 R, 208;
        180/68.1, 219, 225, 229; 280/281 R, 289 S;
        411/517, 353

[56] References Cited

U.S. PATENT DOCUMENTS

| 2,025,848 | 12/1935 | Collis ................................. 411/517 |
| 2,720,273 | 10/1955 | Johnson et al. ..................... 180/229 |
| 4,198,093 | 4/1980 | Muth et al. ....................... 280/289 S |
| 4,334,589 | 6/1982 | Asakura et al. ..................... 180/219 |
| 4,457,552 | 7/1984 | Katsuoka ........................... 296/78.1 |
| 4,479,676 | 10/1984 | Hayes ................................. 296/78.1 |
| 4,549,762 | 10/1985 | Burk et al. .......................... 296/208 |

FOREIGN PATENT DOCUMENTS

| 3204664 | 8/1983 | Fed. Rep. of Germany ..... 296/78.1 |
| 666043 | 9/1928 | France ................................ 296/78.1 |
| 138714 | 2/1920 | United Kingdom ............... 180/229 |
| 905672 | 9/1962 | United Kingdom ............... 296/78.1 |

*Primary Examiner*—Robert B. Reeves
*Assistant Examiner*—Dennis H. Pedder
*Attorney, Agent, or Firm*—Armstrong, Nikaido, Marmelstein & Kubovcik

[57] ABSTRACT

A cowling device for a cycle type vehicle includes a forward unit defining a radiator air intake opening and separate removable central panels spaced from the forward unit to define a pair of side air exit openings. A relatively small amount of intake air is ducted between these central panels to the powerplant, while most is ducted alongside the vehicle through the air exit openings in a streamlined manner.

6 Claims, 6 Drawing Figures

COWLING DEVICE FOR RIDING TYPE VEHICLES

BACKGROUND OF THE INVENTION

1. Field of the Invention

The present invention generally relates to a cowling device. More particularly, the invention relates to a cowling device for riding type vehicles.

2. Description of Relevant Art

Recent years have provided various two-wheeled, three-wheeled, and four-wheeled riding type motor vehicles. Among them, racing vehicles were provided with half-cowling devices mainly adapted to cover surroundings of no more than a handle bar, and full-cowling devices were used, which were adapted to totally cover the front part of such vehicle, to thereby protect a driver from wind pressures while travelling.

Some of the half-cowling devices, as well as almost all of the full-cowling devices, had a wind-conducting hole formed therein, in the vicinity of a heat-generating element such as an engine or a radiator of such vehicle, to thereby vent outwardly from such cowling device those air streams having cooled the heat-generating element.

The cowling devices were formed into a streamlined shape, having a small resistance to air, by way of an integral molding using a metal mold.

The wind-conducting hole was formed at a part of the side face of such cowling device so as to permit an interior space therof to communicate with the outside. Accordingly, the metal mold was of a complicated form and large in size to some extent, particularly in the case of full-cowling device, whereby an associated process of production also was complicated. As a result, the cost of the metal mold itself and that of production were relatively high.

Moreover, the integral molding employed for the formation of the wind-conducting hole constituted a certain resrictrtion to the design configuration thereof, resulting in insufficient achievement of desired wind-venting efficiency of such cowling device as well as desired cooling efficiency of the heat generating portion.

Further, though not so remarkable in the case of a half-cowling device, it was problematic to full-cowling devices that, in the practice of maintenance or inspection of those principal components installed in the interior side of the wind-conducting hole of such cowling device, such as an engine or a radiator, as well as of auxiliary equipments thereof. This required removal of the entirety of such cowling device, which work generally was not easy.

The present invention has been achieved to effectively solve such various problems of conventional cowling devices for riding type vehicles.

SUMMARY OF THE INVENTION

An object of the present invention is to provide a cowling device for riding type vehicles which permits the use of simplified and small-sized metal mold for the molding thereof, extends freedom in design of wind-conducting hole configuration, and enables easier maintenance and inspection work of an engine or a radiator itself and auxiliary equipments thereof.

To substantiate such object, the present invention provides a cowling device for a riding type vehicle having a vehicle body, the cowling device being adapted to cover the vehicle body, and comprising a cowling unit for continuously covering a desired portion of the vehicle body, a plurality of mutually continuous separate cowl members cooperating with each other to constitute the cowling unit, at least two of the cowl members disposed adjacent to each other, and the aforesaid two cowl members having, relative to each other, transition portions thereof at least partially spaced apart from each other to cooperatively constitute a wind-conducting opening.

The aforesaid two cowl members cooperatively constituting the wind-conducting opening may advantageously be detachably attached one to the other thereof and the vehicle body.

The above and further features, objects and advantages of the present invention will more fully appear from the following detailed description of a preferred embodiment of the invention when the same is read in conjunction with the accompanying drawings.

DETAILED DESCRIPTION OF THE PREFERRED EMBODIMENT

Figure 1:
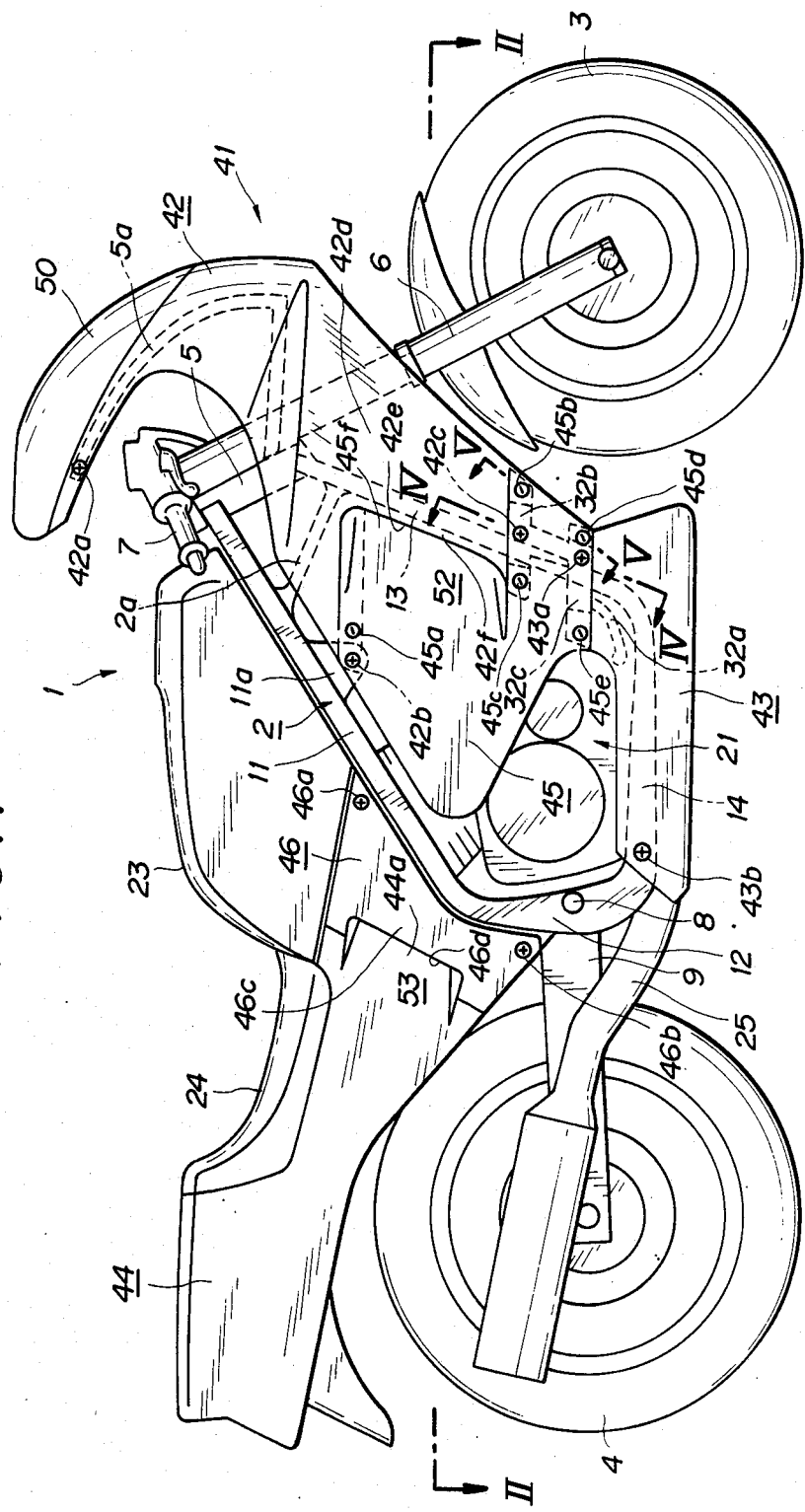
FIG. 1 is a side view of a motorcycle as a two-wheeled riding type motor vehicle equipped with a cowling device according to a preferred embodiment of the present invention.
Figure 3:
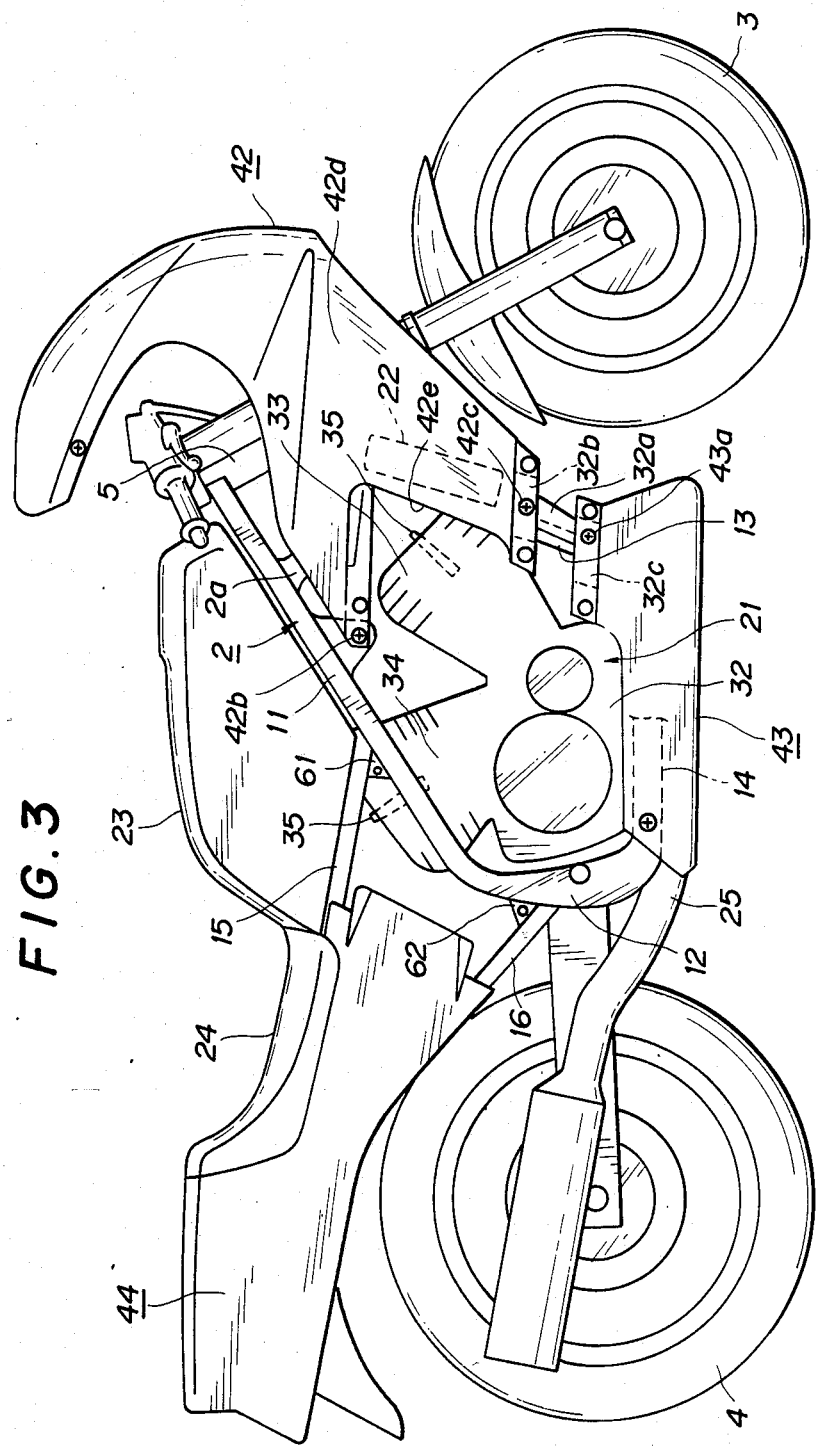
FIG. 3 is a view similar to FIG. 1, showing the cowling device with a front and a rear center cowl members removed.

Referring first to FIGS. 1 and 3, designated at reference numeral 1 is the entirety of a motorcycle as a two-wheeled riding type motor vehicle equipped with a cowling device 41 according to the present invention. The motorcycle 1 includes a square-section, double-cradle frame 2 of a substantially pentagonal form in side view, a rear fork 9 vertically swingably pivoted through a support shaft 8 to the rear part of the frame 2, and a front fork 6 fixed to a steering shaft (not shown) that is rotatably inserted into a head pipe portion 5 of the frame 2. FIG. 1 shows a complete state in which all components of the cowling device 41 are equipped, and FIG. 3, a state in which components 45, 46 are removed.

Between the rear fork 9 and a body of the vehicle is interposed a combination of a cushioning apparatus (not shown) and a progressive linkage (not shown). The rear fork 9 is adapted at the rear end thereof to rotatably support a driven rear wheel 4.

The front fork 5 is provided with a front wheel 3 rotatably attached to the lower end thereof and a handle bar 7 secured to the upper part thereof, so that the front wheel 3 is steerable to the left and right in accordance with steering operations of the handle bar 7.

The cowling device 41 as well as the frame 2 is substantially symmetric with respect to a vertical plane that includes a longitudinal centerline of the vehicle. Hereinafter, therefore, description of such member will be made of the right half that is shown in the figures.

The frame 2 as a vehicle body frame of the motorcycle 1 is constituted with the aforementioned head pipe portion 5, a main pipe portion 11 rearwardly descending from the upper part of the head pipe portion 5, a center pipe portion 12 downwardly extending from the rear end of the main pipe portion 11 that is located substantially at middle of the vehicle level, a down pipe portion 13 rearwardly descending at a relatively steep angle of inclination from the lower part of the head pipe portion 5, and a lower pipe portion 14 substantially horizontally extending to interconnect the lower end of the down pipe portion 13 with that of the center pipe portion 12. Reinforcement portion 2a is interposed between the main pipe portion 11 and the down pipe portion 13. The frame 2 is formed as an integral member of welding necessary parts of the aforesaid portions 5, 11, 12, 13, 14, and 2a.

The frame 2 further includes a seat rail portion 15 extending rearwardly, while slightly ascending, from the upside of a longitudinally substantially middle part of the main pipe portion 11, and a rear stay 16 interconnecting a rear end part (not shown) of the seat rail portion 15 with the rear side of a vertically substantially middle part of the center pipe portion 12.

The respective pipe portions 11, 12, 13, 14 of the frame 2 cooperate with each other to define a space for installation of a water-cooled four-cylinder engine 21 of a v-form in side view, which engine 21 is fixed to a reinforcing frame (not shown) transversely interconnecting the respective rear parts of lower pipe portions 14 arranged at both sides of the motorcycle 1, and joined to fixing points (not shown) on the frame 2.

Moreover, on the front side of the down pipe portion 13 is fixed a radiator 22 adapted for heat radiation of the engine 21. Extending over between the front half part of the main pipe portion 11 and that of the seat rail portion 15, a fuel tank 23 is mounted. On the rear half part of the seat rail portion 15, there is disposed a single seat 24 for the driver's use.

To avoid complexity of representation, the radiator 22 is omitted from FIG. 1. Likewise, in FIG. 3, the frame 2 is not shown at a part thereof covered with crowl members 42, 43.

At the rear side of a pair of rear cylinders 34, 34 of the v-type engine 21, there are installed exhaust paths (not shown) lead out therefrom to be collected into an exhaust pipe 25 which, as shown in the drawings, rearwardly extends along the right side of the motorcycle 1 terminating just before reaching the end of the rear wheel 4. Also at the front side of a pair of front cylinders 33, 33 of the engine 21 are provided exhaust paths (not shown) which lead out therefrom to be collected into another exhaust pipe (not shown), and which rearwardly extend along the left side of the motorcycle 1, terminating at the same position as the rear end of the exhaust pipe 25.

The engine 21 includes a crankcase 32 having rear and front cylinders 34, 33 which are rearwardly and frontwardly inclined, respectively. At respective upper ends of the rear and the front cylinders 33, 34 there are provided ignition plugs 35.

In order to cover the body structure of the motorcycle 1 of such constitution, the cowling device 41 is put thereon and fixed to the frame 2.

The cowling device 41 comprises a singe front cowl member 42 adapted to cover respective surroundings of the handle bar 7, the radiator 22, and the front ends of the front cylinders 33 and provided with a streamlined windshield 50 that is assembled into the upper part thereof and made of a transparent resin. A left and a right front central cowl members 45, 45 are disposed to be a continuous in side view to the left and right rear edges of the front cowl member 42 respectively and are adapted to cover substantially entire parts of corresponding sides of the front cylinders 33 as well as the lower parts of corresponding sides of the rear cylinders 34. A single under cowl member 43 is disposed to be continuous to the respective lower edges of the left and right front central cowl members 45 and is adapted to cover the bottom part of the crankcase 32 as well as the lower pipe portion 14 of the frame 2. A single rear cowl member 44 is fixed to the rear stay 16 and adapted to be stretched over the rear wheel 4, and a left and a right rear central cowl members 46, 46 are disposed to be continuous in side view to the left and right front edges of the rear cowl member 44 respectively and are adapted to cover the respective rear parts of the rear cylinders 34. The rear cowl member 44 has a surface thereof formed so as to be continuous with the outline part of the seat 24.

Among the constituent members 42, 43, 44, 45, 46 of the cowling device 41, the front cowl member 42, the under cowl member 43, the rear cowl member 44, and the left and the right rear central cowl members 46 are regularly fixed at the side of the vehicle frame 2 by use of ordinary screw members, as will be described later, while the left and the right front central cowl members 45 are respectively attached to both the front and the under cowl members 42, 43 in a detachable manner by means of a one-touch clip, as described below.

With respect to the aforesaid constituent members 42 to 46 of the cowling device 41, there will be described below the fixing structure to the vehicle body frame 2. Since the structure is symmetrical with respect to a longitudinally extending vertical centerplane of the motorcycle 1 the description of fixing structure at the left side thereof is omitted.

Incidentally, for the aid of comprehension, in FIGS. 1 and 3, such points that any of the cowl members is screw-fixed at the side of the vehicle body frame 2 are indicated with a mark $\oplus$ having a plus sign in a circle, and such points that some of the cowl members are detachably fastened to each other by means of a one-touch clip are indicated with no more than a circular mark $\bigcirc$ or with a mark $\ominus$ having a minus sign in a circle.

The front cowl member 42 is screwed, to be fixed relative to the vehicle body frame 2, at a rear end point 42a of a fairing stay 5a which is extended first frontwardly from the head pipe portion 5 by a predetermined length therefrom and then curvilinearly ascending rearwardly, a lower point 42b of a bracket portion 11a which is downwardly projected from the underside of a longitudinally substantially middle part of the main pipe portion 11, and a longitudinally substantially intermediate point 42c of an uppr side part 32b of an under cowl stay 32a of a fallen-H form in side view that is frontwardly ascendingly extended from the right side of the crankcase 32.

The under cowl member 43 is screwed, to be fixed relative to the vehicle body frame 2, at a front point 43a of a lower side part 32c of the under cowl stay 32a, and a rear end point 43b of the lower pipe portion 14.

The front cowl member 42 has a lower side portion 42d formed with a cut part 42e substantially corresponding in side view to the contour of the front cylinder 33, including that of the plug 35, which side portion 42d is transversely outwardly bulged.

In order to substantially continuously cover in side view the space between the entirety of the lower edge of the front cowl member 42 and the upper edge of the under cowl member 43, the front central cowl member 45 is detachably fastened by means of a one-touch clip to the front cowl member 42 at a point 45a slightly frontwardly spaced apart from the screw-fixing point 42b in the upper side of the cut part 42e of the cowl member 42, and at points 45b, 45c frontwardly and rearwardly spaced apart from the screw-fixing point 42c in the lower edge part of the lower side portion 42d of the member 42, and likewise to the under cowl member 43 at points 45d, 45e frontwardly and rearwardly spaced apart from the screw-fixing point 43a in the upper edge part of the cowl member 43.

The front central cowl member 45 has a front portion 45f transversely inwardly curved at a position corresponding to a front side part 42f of the cut part 42e of the front cowl member 42, such that the front edge thereof is positioned behind the radiator 22.

With such an arrangement, the front side part 42f of the cut part 42e of the front cowl member 42 and the front portion 45f of the front central cowl member 45 have defined therebetween a wind-conducting hole 52 for rearwardly venting alongside the vehicle body those air streams having passed through the radiator 22 while the vehicle is travelling.

On the other hand, as described, the rear cowl member 44 is fixed to the rear stay 16.

The rear central cowl member 46 is screwed to be fixed at a front end point 46a thereof to a fixing member 61 provided at the branching part between the main pipe portion 11 and the seat rail portion 15, and at a lower end point 46b thereof to a fixing member 62 provided at the branching part between the center pipe portion 12 and the rear stay 16.

The rear central cowl member 46 is a generally flat member.

In a rear portion 46c of the rear central cowl member 46, there is opened a cut 46d of a rectangular form in side view. At a position corresponding to the cut 46d, a front middle part 44a of the rear cowl member 44 is transversely inwardly curved, such that the front edge of the part 44a is positioned behind the rear cylinder 34.

With such arrangement, the rear portion 46c of the rear central cowl 46 that is opened with the cut 46d and the front middle part 44a of the rear cowl member 44 have defined therebetween a wind-conducting hole 53 for rearwardly venting alongside the vehicle body those air streams having passed around the rear cylinder 34 while the vehicle is travelling.

Figure 2:
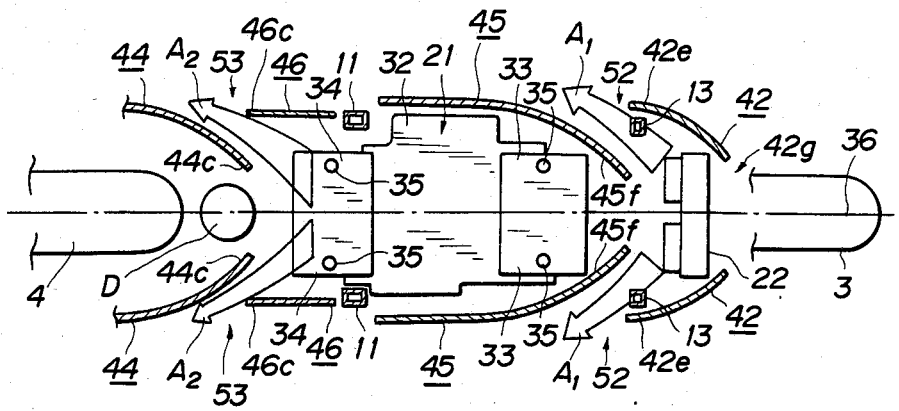
FIG. 2 is a sectional view taken along line II—II of FIG. 1.

FIG. 2 is a sectional view taken along II—II of FIG. 1. The engine 21 is schematically shown. In FIG. 2, designated by reference numeral 36 is the longitudinal axis of the motorcycle 1, and reference character D is the cushioning apparatus for the rear wheel 4.

The front cowl member 42 has a front lower opening 42g through which the front fork 6 is inserted to be steerable to the left and right. The opening 42g is adapted to serve as a cooling air inlet while the vehicle is travelling.

In other words, when the motorcycle 1 is travelling, air flows into the opening 42g from the front thereof and then, after having deprived the radiator 22 of heat, flows out from the left and right wind-conducting holes 52 in the directions of $A_1$, $A_1$.

In this respect, that part of air that has not been vented through the wind-conducting holes 52, 52 is caused to flow from between the respective front portions 45f, 45f of the left and right front central cowl members 45, 45 toward the front cylinders 33, 33, depriving the cylinders 33, 33 of heat. This air flow is to be vented from the right and left wind-conducting holes 53, 53, which are defined between the left and right rear central cowl members 46, 46 and the rear cowl member 44, in the directions of $A_2$, $A_2$, as well as those air streams which have been taken in through a left and a right gaps defined between the respective rear lower edges of the front central cowl members 45, 45 and the rear upper edge of the under cowl member 43 and deprived the rear cylinders 34 of heat.

Figure 4:
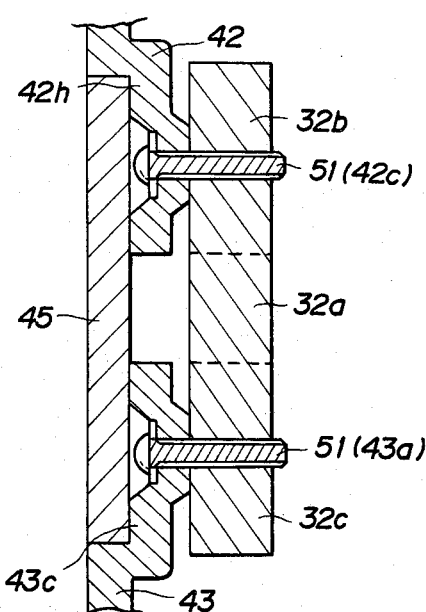
FIG. 4 is a sectional view taken along line IV—IV of FIG. 1.

FIG. 4 is a sectional view taken along line IV—IV of FIG. 1. It shows the screw-fixing structure of the front and the under cowl members 42, 43 relative to the under cowl stay 32a.

As shown in FIG. 4, the front and the under cowl members 42, 43 are fastened, by a pair of screws 51, 51 respectively, to the under cowl stay 32a which is fixed to the engine 21.

In the lower side of the front cowl member 42 and the upper side of the under cowl member 43 are formed stepped portions 42h, 43c, respectively, in order for the front part of the front central cowl member 45 to fit therein at each side of the vehicle, so that the cowl members 42, 43, 45 are configured to be apparently continuous at respective transition portions therebetween.

Those parts of the cowl members 42, 45 intended to be fixed by the screws 51, 51 are recessed so that the front cowl member 45 has internal surfaces free from interference with the screws 51, 51.

As will be comprehended, at each side, the screws 51, 51 are covered with the front central cowl member 45 and kept from exposure to the outside, under the condition that the cowl member 45 is attached to the front and the under cowl members 42, 43.

Similar effect is achieved also at the screw-fixing point 42b between the front cowl member 42 and the main pipe bracket portion 11a. At the screw-fixing points 42a, 43b, 46a, and 46b, however, the fixing screws are exposed.

Figure 5:
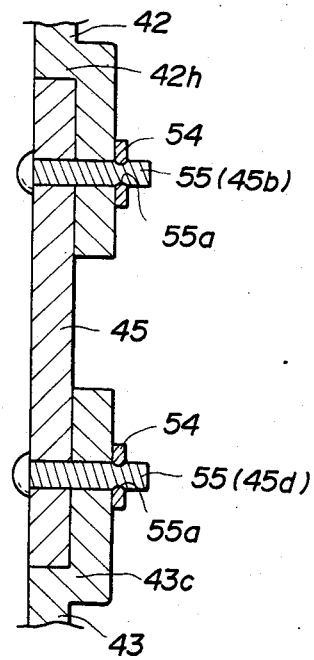
FIG. 5 is a sectional view taken along line V—V of FIG. 1.

FIG. 5 is a sectional view taken along line V—V of FIG. 1. It shows the respective detachable fixing structures by use of one-touch clips between the front and the under cowl members 42, 43 and the front central cowl member 45 at each side of the vehicle.

As shown in FIG. 5, the front central cowl member 45 is fastened at the front part thereof to the recessed portion 42h in the lower side of the front cowl member 42 and the recessed portion 43c in th upper side of the under cowl member 43 by using one-touch clips 54, 54, respectively.

The one-touch clips 54, 54 are elastically fitted in ring-like slots 55a, 55a formed in the respective circumferences of threadless bolts 55, 55 which are inserted through the front central cowl member 45 and the front and the under cowl members 42, 43 respectively.

Figure 6:
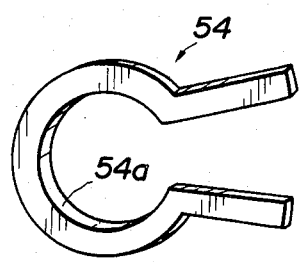
FIG. 6 is a view showing the entirety of a one-touch clip.

Each of the clips 54 is given in the form of such a clamp member as shown in FIG. 6, and has a circular part 54a adapted to be fit in the ring-like slot 55a of each bolt 55. It is designed to be easily attachable to and detachable from the bolt 55 by fingers, without the need of using a special implement therefor.

Also at the remaining fixing points 45a, 45c, 45e between the front central cowl member 55 and the front and the under cowl members 42, 43, such a type of fixing structure is employed as similar to the case of FIG. 5 to thereby permit detachable engagement therebetween.

According to the present invention, as described, the cowling device 41 comprises the separable cowl members 42, 43, 44, 45, 45, 46, 46, in which the members 42, 43, 45, 45 are adapted to cooperate together to constitute a front cowl unit having a streamlined continuous outer surface and likewise the members 44, 46, 46 are adapted to form a rear cowl unit having a streamlined continuous outer surface, so that metal molds for molding such respective constituent members of the cowling device 41 are effectively permitted to be small-sized.

Moreover, the wind-conducting holes 52, 53 as openings adapted to rearwardly vent alongside the vehicle those air streams having deprived the radiator 22 and the rear cylinders 34 of heat while the vehicle is travelling are formed by transversely spacing apart, between the cowl members 42, 45, the transition parts or continuous parts 42f, 45f from each other and, between the cowl members 44, 46, the transition parts or continuous parts 44a, 46c from each other, so that the metal molds for molding the constituent members of the cowling device 41 are favorably permitted to be simplified in configuration, thus resulting in reduction in the cost of each metal mold itself as well as in the production cost of the cowling device 41.

Further, such a distinct system of formation of the wind-conducting holes 52, 53 as described above permits the freedom of configuration design to be greatly expaned, thus possibly achieving sufficient wind-venting efficiency and cooling efficiency.

Furthermore, cowl members 42, 45, 45 cooperate together to form the wind-conducting holes 52, 52, each of the members 45, 45 which cover the cylinders 33, 34 of the engine 21 and the radiator 22 at either side or from behind thereof, where checking and maintenance work may be frequently performed. Cowl members 45, 45 are easily detachably fastened to other cowl members 42, 43, so that removal of cowl members 45, 45 are permitted to be promptly made when necessary, thus achieving ease in checking and maintenance work of the engine 21 and the radiator 22.

In this respect, since the interior of the rear central cowl members 46, 46 usually is a space utilized for installation of auxiliary equipments such as a battery, the members 46, 46 may advantageously be detachably fixed relative to the vehicle body by means of a one-touch clip.

Incidentally, in the foregoing embodiment, the wind-conducting holes 52, 53 are adapted so as to serve as a pair of wind-venting holes. In this respect, in a riding type vehicle of a certain constitution, and particularly of a constitution having a certain arrangement of heat-generating parts, the present invention may advantageously be embodied such that, out of a pair of separate cowl members adapted to cooperate together to constitute a wind-conducting hole, one that is located behind the other is transversely outwardly bulged more than the other to thereby make the wind-conducting hole functionable as an air inlet.

Moreover, in the embodiment described, exemplarily between the cowl members 42, 45 the transition parts 42f, 45f are transversely spaced apart from each other to define the wind-conducting holes 52 therebetween. In a preferred embodiment of the present invention, however, such pair of transition parts may be at least one partially cut to provide a wind-conducting hole, without being transversely spaced apart from each other.

Further, in the embodiment described, each of the wind-conducting holes 52, 53 has two cooperating cowl members 42, 45 or 44, 46. In this respect, such wind-conducting holes may advantageously have more than two cooperating cowl members.

Still more, in the embodiment described, the present invention is applied to the motorcycle 1 as a two-wheeled riding type vehicle. However, it will be easily understood that the present invention may be advantageously embodied as a cowling device for riding type vehicles with more than two road wheels.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

We claim:

1. A cowling device for a riding type vehicle having a vehicle frame, said cowling device covering said frame and comprising:
    a forward cowling unit defining a first air intake opening and trailing lateral cut-out portions;
    a pair of cowl panels disposed rearwardly of the forward cowling unit and attached thereto, said attached panels at forward edges thereof defining a second air intake opening smaller than said first opening;
    said second opening spaced transversely inwardly of the respective cut-out portions; and
    each forward edge of the cowl panel and a respective trailing cut-out portion defining an air exit opening therebetween.

2. A cowling device according to claim 1, wherein:
    said vehicle (1) includes a heat-generating part (22; 34) covered with said cowling device (41); and
    said air exit opening (52; 53) is located in the vicinity of said heat generating part (22; 34).

3. A cowling device according to claim 2, wherein: said air exit opening (52; 53) is located in the rear of said heat-generating part (22; 34), to be adapted to rearwardly vent alongside said vehicle those air streams having deprived said heat-generating part (22; 34) of heat.

4. A cowling device according to claim 1, wherein:
    said vehicle (1) includes auxiliary equipment (22, 33, 34, 35) relatively frequently subject to an inspection work; and
    said pair of cowl panels (42, 45), is adapted to cover said auxiliary equipment.

5. A cowling device according to claim 1, wherein: said riding type vehicle (1) is a motorcycle.

6. The cowling device of claim 1, wherein said pair of cowl panels is detachably attached to the forward cowling unit by way of a threadless bolt disposed through corresponding holes in said two cowl panels, said bolt being held in position by a partially circular one-touch clip engaged with a ring-like slot located at one end of said bolt.

* * * * *